(No Model.)
A. BOYNTON.
SAW.
No. 373,717. Patented Nov. 22, 1887.
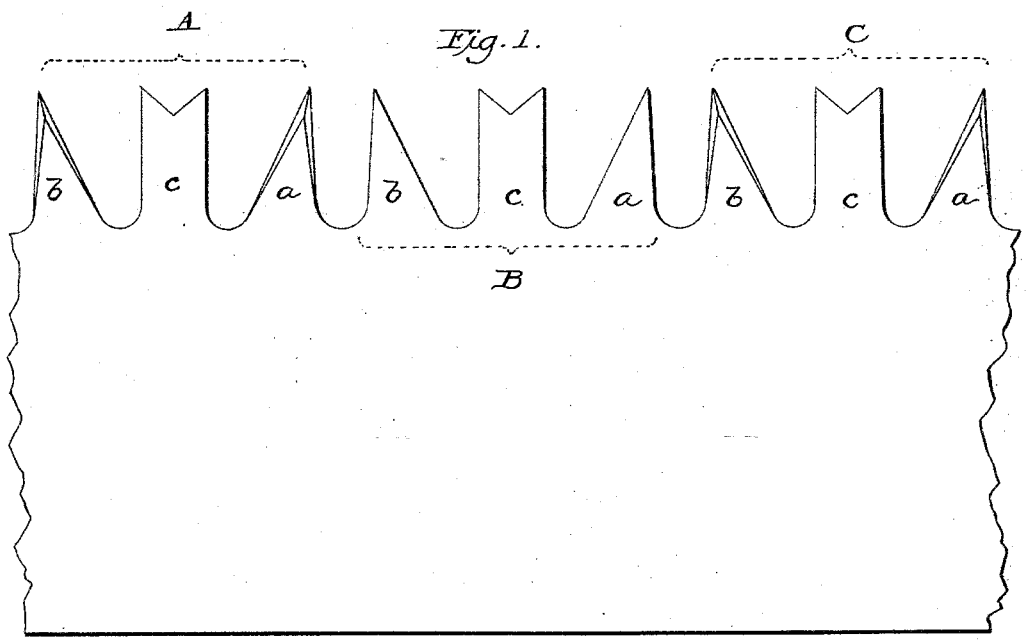
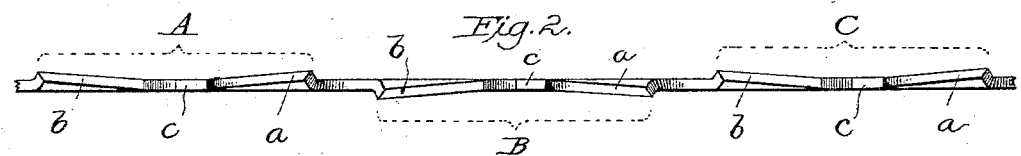
Witnesses:
James F. DuHamel
Walter S. Dodge
Alfred Boynton,
Inventor,
by Dodge & Son,
his Attys.

United States Patent Office.

ALFRED BOYNTON, OF BROOKLYN, NEW YORK, ASSIGNOR OF TWO-THIRDS TO C. W. BOYNTON AND H. W. PEACE, BOTH OF SAME PLACE.

SAW.

SPECIFICATION forming part of Letters Patent No. 373,717, dated November 22, 1887.

Application filed October 27, 1886. Serial No. 217,344. (No model.)

*To all whom it may concern:*

Be it known that I, ALFRED BOYNTON, of Brooklyn, in the county of Kings and State of New York, have invented certain new and useful Improvements in Saws, of which the following is a specification.

My invention relates to crosscut-saws, and is designed as an improvement upon the well-known "lightning-tooth." (Covered by Letters Patent No. 175,330, granted to E. M. Boynton March 28, 1876.)

The invention may be described as consisting in spreading or separating the two points of the M or lightning tooth and introducing between said points a clearer-tooth, by which plan I produce a triple-point tooth consisting of two points having upright or substantially upright outer faces and beveled or slanting inner faces sloping toward the base of an intermediate clearer-tooth. Each triple tooth is complete in itself, and each has its two cutting-points set or bent outward in the same direction, the points of each triple tooth being dressed in the reverse direction from those of the adjoining or nearest teeth preceding or following.

In the accompanying drawings, Figure 1 is a face view of a saw embodying my invention; Fig. 2, an edge view of the same.

A B C each indicate one of the triple or compound teeth, each tooth consisting of two cutting-points, *a b*, and an intermediate clearer, *c*. The points *a b* each have practically upright outer faces—that is to say, the faces farthest removed from the central clearer, *c*, are substantially perpendicular to a line running lengthwise of the saw and touching the points of the teeth, while the inner faces or edges of the points *a b* slant or incline from the outer point toward the base of the intermediate clearer, *c*. The points *a b* of tooth A are bent outward laterally or "set" to one side of the blade. Those of the next tooth, B, are bent in the reverse direction, or to the other side; those of tooth C the same as those of tooth A, and so on, alternate teeth being dressed alike.

It is particularly to be noted that both points of each tooth are dressed and set alike, that face or edge, of course, which is on the inner side of the tooth being beveled in all cases. Thus, in Fig. 2, as the edge of the saw is presented to the eye, the points *a b* of the first and third teeth, A and C, are bent upward, and the points *a b* of tooth B are bent downward. This mode of setting the points of the teeth is highly important in connection with the intermediate clearer, and to this arrangement is to be attributed the great rapidity and cleanness of cut.

It has long since been demonstrated by the so-called "lightning" saw that the M-tooth, with both points dressed and set alike, cuts faster and better than the same tooth with the points reversely dressed and set. It has also been demonstrated by the well-known "champion" saw (covered by Letters Patent No. 37,835, dated March 3, 1863,) that the clearer-tooth greatly improves the action of the saw for certain classes of work and kinds of wood. Now, by practical tests, and after repeated attempts made with various forms and arrangements of teeth, I have succeeded in combining in one saw the peculiar advantages of both the lightning and the champion saws, the present saw being found to work well in all kinds of wood. The outer edges of the points *a b* may be slightly inclined, if desired; but should be nearly upright.

Having thus described my invention, what I claim is—

1. The herein-described saw, consisting of a blade provided with compound teeth, as A B C, each tooth consisting of cutting-points *a b*, having substantially upright outer edges and inclined inner edges, and intermediate clearer, *c*, the points *a b* of each tooth being dressed and set alike, and the points of each tooth being set and dressed in the reverse direction from the points of the adjoining teeth.

2. A saw provided with a series of triple teeth, each tooth consisting of two cutting-points and an intermediate clearer, the cutting-points having substantially upright faces on the sides farthest from the clearer and being dressed and set on the same side or in the same direction, and the cutting-points of each triple tooth being dressed and set in the reverse direction from those of the next.

ALFRED BOYNTON.

Witnesses:
WILLIAM H. PRUDEN,
ANTON LAUMANN.